United States Patent

[11] 3,628,151

| [72] | Inventor | Robert S. Roeder |
| | | Dunedin, Fla. |
| [21] | Appl. No. | 1,497 |
| [22] | Filed | Jan. 8, 1970 |
| [45] | Patented | Dec. 14, 1971 |
| [73] | Assignee | Sperry Rand Corporation |

[54] RADIOMETER GAIN CONTROL
12 Claims, 1 Drawing Fig.

[52] U.S. Cl. ................................................ 325/363,
325/386, 325/389, 325/395, 325/397, 325/398,
325/399, 325/404, 325/407, 325/408, 325/409,
325/476, 325/483
[51] Int. Cl. ..................................................... H04b 1/06
[50] Field of Search ............................................ 179/15 OK;
324/82, 83, 86; 328/166; 329/112, 120, 124, 125;
343/225, 17.7; 250/71.5, 72, 83, 83.3; 325/60,
322, 363, 369, 373, 376, 377, 378, 386, 387, 389,
395, 396, 399, 404, 407–409, 483, 484, 476

[56] References Cited
UNITED STATES PATENTS

| 3,409,827 | 11/1968 | Goggings ..................... | 325/363 |
| 3,525,037 | 8/1970 | Madden et al. ............... | 325/363 |

*Primary Examiner*—Robert L. Griffin
*Assistant Examiner*—Albert J. Mayer
*Attorneys*—S. C. Yeaton and Reginald V. Craddock ABSTRACT: An improved microwave radiometer of the comparison type features elimination of loss of calibration due to long term gain changes through the addition of a quadrature modulation signal path in the comparison radiometer as a means of coupling a fixed gain control reference signal into the radiometer receiver. The reference signal is ultimately separated at the output of the receiver and provides a feedback signal to correct for all undesired receiver gain changes. The radiometer and gain control signals enjoy use of a common path through a portion of the radiometer receiver and perform their individual functions in a noninterfering manner.

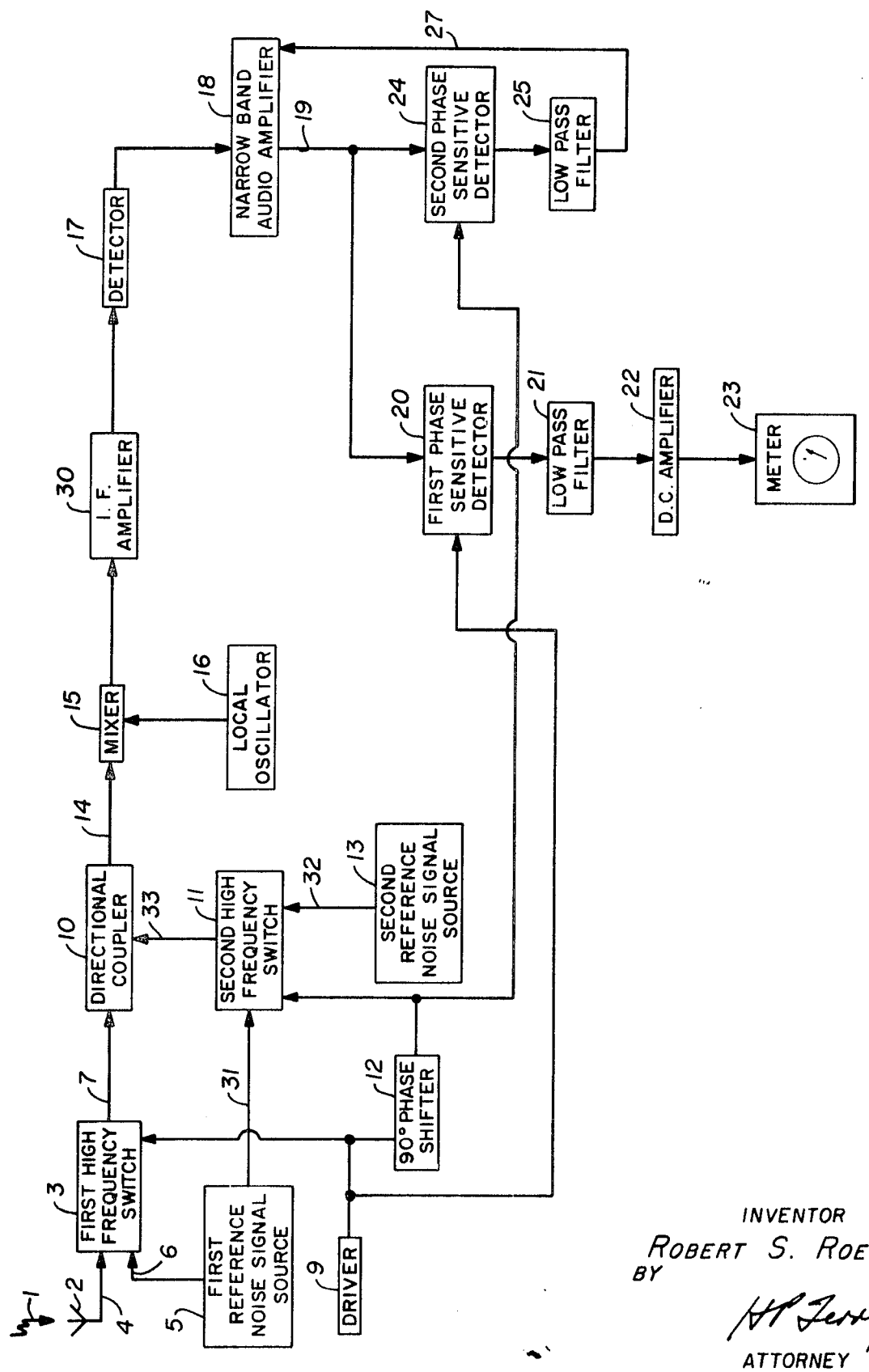

RADIOMETER GAIN CONTROL

BACKGROUND OF THE INVENTION

1. Field of the Invention

The invention pertains to the art of microwave radiometry using comparison of the amplitude of a signal to be investigated, such as a thermal noise signal, to the amplitude of a locally generated reference signal. In this type of radiometer receiver, an amplitude detector is connected alternately and cyclically through a receiver to an antenna and then to a local reference signal generator. The invention more particularly relates to the use of one or more such local reference generator systems in an amplitude comparison radiometer receiver for the purpose of fixed control of the overall gain of the receiver.

2. Description of the Prior Art

While other types of radiometric devices have been used with some success, the comparison type of radiometer has been the most widely used for the study of relatively low-level noiselike radiofrequency signals, especially where the noise signals to be examined are often small in comparison to the internally generated noise level within the radiometer receiver. Comparison radiometer systems achieve substantial cancellation of the receiver background noise and self-noise, permitting relatively accurate measurements of low-level radiofrequency signals.

While there are other types of comparison radiometers, one popular type of radiometer particularly for use in the microwave frequency bands is that in which an incoming signal to be investigated and a standard or calibrated reference noise signal are compared. The method employed consists essentially of the comparison of an unknown noise signal amplitude coming from the source to be examined with a known amplitude noise signal from a calibrated source, and the method can be used to measure the effective temperature of an unknown source with considerable accuracy. In such instruments, the receiver input is switched between the antenna and the local reference signal generator at a relatively high rate, and the detected and amplified receiver output is coupled to a phase-sensing detector operated in synchronism with the switching rate. The final unidirectional output signal from such a radiometer receiver is proportional to the difference between the temperature of the reference signal source and the temperature of the source viewed by the antenna, since the phase-sensing detector acts automatically to subtract the background or internal noise of the receiver.

While the radiometers of the comparison type have certain advantages, they may also have certain clear disadvantages. Slight overall gain variations in the receiver can cause severe degradation of its accuracy, since gain variation has a direct effect on the output signal in any high-sensitivity radiometer. Thus, changes in gain, such as those of long term nature caused by drift in power supply voltages, changes in ambient temperature, and aging of components, can seriously limit the usefulness of the radiometer.

Manual and automatic null-balance techniques commonly used in radiometer receivers are complex and somewhat expensive. In the null-balance method, a signal of a calibrated reference noise temperature is added to the unknown incoming signal to be examined until the sum exactly equals the output of a first reference noise signal source. With zero differential between the two equal signals at the input to the radiometer, it inherently is insensitive to receiver gain variation. The cost of the added elements required, including a stable noise source and power supply and a precision attenuator for making manual null-balance is relatively high. Furthermore, with the automatic null-balance method, the receiver output is usually nonlinear, whereas the output voltage should remain a linear function of the temperature of the object viewed by the antenna. The nonlinearity is produced because microwave attenuators available for controlling the injected noise level are quite nonlinear.

SUMMARY OF THE INVENTION

The present invention is an improved radiometer providing means for detecting and measuring very weak electromagnetic signals, including electrical noise signals of the thermal noise level type and comprising relatively simple apparatus providing improved gain stability and therefore greatly improved calibration accuracy.

In the invention, signals to be investigated are received by a suitable antenna and are compared with reference signals provided by a suitable reference signal generator. Normally, the signals being compared are broadband or white noise signals. A microwave switching device operated at a relatively high rate cyclically and repeatedly applies the received and reference signals to the input of the radiometer receiver. The output of the detector of the radiometer receiver is an audio signal having a strong audio component at the same audiofrequency as the frequency at which the microwave switch is operated. The audio is applied through a narrow-band audio amplifier to a phase-sensitive detector, thence through a low-pass filter and DC amplifier to a zero center DC meter.

In the invention, improved gain control is effected by use of a quadrature modulation signal path as a means for passing a gain control reference signal through the radiometer receiver. The reference signal is separated at the output of the receiver for the purpose of generating a feedback signal for control of the overall gain of the radiometer receiver. The true radiometer and gain control signals have quadrature phase relation and therefore economically use a common path through a portion of the receiver. They perform their individual functions in an entirely compatible manner, the presence of the one such signal not interfering with the function of the other.

According to the invention, parts already present in the receiver cooperate effectively in performance of the gain control function. Even added components are duplicates of those already operating in the receiver, thus yielding the greater economy and reliability which normally is achieved when multiple similar parts are used. Gain regulation is continuous and simultaneous with the actual radiometric measurement operation of the receiver. The problems inherent in the null-balance type of receiver operation are eliminated and linear operation of the receiver is ensured.

BRIEF DESCRIPTION OF THE DRAWINGS

Referring now to the drawing, the single FIGURE is a block diagram of a preferred form of the invention.

DESCRIPTION OF THE PREFERRED EMBODIMENT

In the FIGURE, there is shown a block diagram of the novel radiometer system. While shown in block diagram form, it will be seen that the invention is useful over a wide spectrum of radiofrequencies, and that it is of particular merit for use in the high frequency or microwave bands, including those of the ultra high-frqency region or higher. It will be understood that the invention is useful in the type of radiometer known in the art as the comparison radiometer. In the comparison radiometer the radiometer receiver is cyclically switched from a receiving antenna to a reference noise signal source.

The invention will be discussed herein in operation in a known type of comparison radiometer receiver in which an electronically actuated microwave switch first connects incoming signals collected by an antenna to the radio receiver, and then connects instead a temperature-controlled microwave noise source to the receiver. Cyclic repetition of this switching process is conventionally employed in certain prior art radiometer concepts.

However, the invention is equally applicable in many circumstances in which it is preferred to use the classical microwave type of comparison radiometer in which a noise reference element of known temperature is physically cyclically injected into and withdrawn from the transmission line joining the receiving antenna to the radiometer receiver. For the sake of simplifying the explanation of the invention, however, it is elected to present it in operation in an electronically switched system.

In the FIGURE, signals 1 such as, for instance, low-power, noiselike radiofrequency signals commonly associated with thermal radiation, generated by any source to be examined by the radiometer, are received by an antenna 2 which may be any of various known types of broadband microwave or other antennas previously used in the radiometer art. The antenna accepts all signals falling within its pass band and supplies them to an input 4 of a high frequency switching device 3. An opposite pole or input 6 of the switching device 3 is supplied with the output of a first reference noise signal source 5. Noise source 5 may be either a temperature-controlled waveguide load or a conventional gas tube or semiconductor noise source. It is normally set at approximately the temperature level of the background noise seen by antenna 2.

The switching device 3 may be a known low-noise microwave switch, as it functions cyclically and alternately to connect antenna 2 or the first reference noise signal source 5 to the input 7 of the remaining elements of the radiometer receiver. Switch 3 might, for instance, be a mechanically operated type of switch actuated by a mechanical link operated by driver 9. However, in the illustrated embodiment, it is shown as a conventional ferrimagnetic or other microwave switch whose state is cyclically changed by driver 9. The switch 3 may, for instance, be a known type of latching ferrite switch.

The input transmission line 7 supplies the cyclically varying signal propagating within it through directional coupler 10 (whose function remains to be discussed) to a conventional microwave mixer 15 via transmission line 14. A local oscillator 16 supplying high-frequency signals in the usual manner to mixer 15 causes mixing of the two input signals, generating a modulated difference frequency signal in the intermediate frequency spectrum for application to broadband intermediate frequency amplifier 30.

The output of intermediate frequency amplifier 30, when there is a difference in the levels of signals input at ports 4 and 6, is an amplitude modulated signal, the modulation frequency being the switching repetition rate of switch 3. Envelope detector 17 is used in the conventional manner to remove this audio modulation, which may be of a frequency on the order of 100 cycles per second, from the intermediate frequency envelope, and to pass it through tuned or narrow-band audio amplifier 18. Amplifier 18 has the center of its pass band coincident with the switching frequency of switch 3.

In order to compare the phase and amplitude of the signals on ports 4 and 6, a sinusoidal output of driver circuit 9 in phase with the operation of switch 3 is supplied as a reference signal to one input of a first phase-sensitive detector 20. The output of audio amplifier 18 comprises a second input to the first phase-sensitive detector 20, a device employed in a conventional manner to detect the relative amplitudes of input signals and to evaluate which input signal is the greater.

As in conventional practice, the output of first phase-sensitive detector 20 is a polarity-reversing direct voltage, which signal is subjected to the action of a low-pass filter 21, is amplified by DC amplifier 22, and is finally displayed, for instance, by a zero-center direct current meter 23. The adjustment of driver 9 and the phase of the reference signal generated by it relative to operation of switch 3 is such that, when signal 1 is equal in amplitude to the reference noise signal from source 5, the meter needle points to zero, for instance, on the scale of meter 21. When signal 1 differs in amplitude with respect to the reference noise signal from source 5, the needle is directed proportionally to one side or to the other of the zero indication of meter 23, for example.

As has been noted previously, the type of conventional comparison radiometer described above has serious stability problems. Inherent in the comparison operation of the radiometer is relatively good short term gain stability, but the means which works to provide that short term gain stability is not adequate for reducing or eliminating long term gain variations such as produced by drift in power supply voltages, changes in ambient temperature, aging of components, and the like. The problems associated with any type of gain stability in a microwave radiometer are better appreciated by realizing that the typical radiometer receiver must be a high-gain device. It may have overall gain, even excluding the gain contribution of the antenna, of the order of 180 db. Since radiometer receivers are normally operated as linear power receivers, a total gain variation of only 0.5 db would generate a 12 percent error in receiver output. Such is an error entirely unacceptable in most applications, many of which need output stability on the order of 0.5 percent, corresponding to a gain variation no greater than 0.02 db. The inventive apparatus now to be described achieves the desired gain stabilization by addition of a quadrature modulation signal path to the above-described system as a means of coupling a fixed gain control reference signal through the receiver. The new reference signal is separated at the output of the receiver and provides a feedback signal to correct for all undesired gain changes.

Referring again to the FIGURE, it is seen that the inventive apparatus includes a second high-frequency switch 11 whose input ports 31 and 32 are respectively coupled to the first reference noise signal source 5 and to a second reference noise signal source 13. Switch 11 may be a duplicate of switch 3; for example, it may be a latching ferrite switch of known type. Likewise, the second reference noise source 13 may be a duplicate of the first reference noise source 5. Source 5 may, for example, be a temperature-controlled waveguide load, a gas tube noise source, or a semiconductor noise signal source. The effective temperature of the second reference noise signal source 13 will be set higher than the effective temperature of the first reference noise signal source 5; thus, there will always be a fixed differential between the signals coming out of the second high-frequency switch 11 (fixed in amplitude and in phase sense).

The phase of operation of the second high-frequency switch 11 is determined by using driver 9 (which also drives switch 3) to drive switch 11, but by phase shifting the output of driver 9 by passing its output through 90° phase shifter 12 before applying it to switch 11. Thus, the point of shifting of signals appearing in transmission line 33 is removed by 90° from the point of shifting of signals in transmission line 7.

A predetermined portion of the signal in transmission line 33 is coupled by directional coupler 10 into the output transmission line 14 along with the signal already appearing in transmission line 14. Both signals are processed as would be expected without ill effects because of their simultaneous presence by local oscillator 16, mixer 15, intermediate amplifier 30, detector 17, and narrow-band audio amplifier 18. For example, since narrow-band amplifier 18 is peaked at the same frequency as the switching frequencies of the respective first and second high-frequency switches 3 and 11, quadrature displaced signals appear at the output of narrow-band audio amplifier 18. These quadrature displaced signals are separated through the agency of the first phase-sensitive detector 20, already discussed, and the second phase-sensitive detector 24.

The output of the second phase detector depends upon two inputs. A first input is fed by conductor 19 to both phase-sensitive detectors 20 and 24. The second input to detector 24 is a reference signal supplied by driver 9, but phase shifted by 90° because it flows through phase shifter 12. As a consequence of the demodulation action of phase-sensitive detector 24, an output is produced whose amplitude is proportional to the difference between the constant outputs of the first and second reference noise signal sources 5 and 13. The amplitude of this signal is also proportional to the gain of the receiver system, and any variations of the latter gain are reflected as changes in the output level of phase-sensitive detector 24.

After subjection to the action of a low-pass filter 25, if desired, the output of the second phase-sensitive detector 24 is supplied to an appropriate gain controllable stage of narrow-band audio amplifier 18, where it is employed, in effect, to modify the overall gain of the receiver in such a way as to correct for any undesired drift of the receiver gain. The reverse gain control voltage on conductor 27 could also be applied in the well-known manner to stages of the intermediate frequency amplifier 30 for the same corrective purpose. In some applications, it may be useful to supply the voltage on conductor 27 as a forward gain control voltage to DC amplifier 22, for instance.

In operation, high-frequency radiometric signals collected by antenna 2 pass through the first high-frequency switch 3 to directional coupler 10; switch 3 also cyclically passes signals from the first reference noise signal source 5 through coupler 10. A reference signal for gain control purposes derived by the second high-freqency switch 11 from the respective first and second reference noise signal sources 5 and 13 is added in directional coupler 10 to its output in transmission line 14. The first or radiometer switch 3 and the second or gain control switch 11 operates at the same rate, being driven in common by driver circuit 9, but in phase quadrature. The respective outputs of high-frequency switches 3 and 11 then flow through receiver elements including mixer 15, intermediate frequency amplifier 30, detector 17, and narrow-band amplifier 18 to the output 19 of the latter.

Following output conductor 19, the signal bearing the true radiometer information and that bearing the quadrature signal developed for receiver gain control are separated by quadrature phased demodulators or phase-sensitive detectors 20 and 24. The output of the first phase-sensitive detector 20 which is the true radiometer signal demodulator, is a unidirectional signal whose amplitude is proportional to the difference of the temperature of the effective source viewed by antenna 2 and the constant reference temperature generated by the first reference noise signal source 5, as in standard comparison radiometer receivers. The output of the second phase-sensitive detector 24, which serves as the gain control demodulator, is a signal whose amplitude is proportional to the constant differences between the two reference temperatures generated by the respective first and second reference noise signal sources 5 and 13 and is proportional also to the overall gain of the radiometer receiver. This latter signal is used, as previously explained, to control the overall gain of the radiometer receiver by applying it as a negative feedback voltage, for example, to a gain controllable stage of audio amplifier 18. It should be understood that the usual radiometer receiver is a linear power receiver. Therefore, the combining of the true radiometer and the gain control signals in the same channel within the microwave front end of the receiver is permissible.

It has been observed that alternate low, are available for the high-frequency switches 3 and 11 and for the reference noise signal sources 5 and 13. The preferred type of circuit employed for phase-sensitive detectors 20 and 24 also depends upon the application of the radiometer system. In general, if the switching rate for high-frequency switches 3 and 11 is to be high, conventional semiconductor demodulator circuits will be used in circuits 20 and 24. If the switching rate is low, then electromechanical phase detectors may be preferred in circuits 20 and 24, they being preferred on the grounds of simplicity and low cost. For example, a system using latching ferrite switches 3 and 11 would use semiconductor phase detector circuits 20 and 24 because the switching rate required is high and size, weight, and power must be minimized. In atmospheric probing radiometers, the choice, on the other hand, might be the classical rotary waveguide radiometer chopper and a pair of electromechanical phase detectors or demodulators such as solenoid-driven reed switches.

It will be observed that the invention has many advantages over prior art solutions to the radiometer gain control or calibration problem, as enumerated above. Furthermore, continuous gain control action is provided simultaneous with radiometer signal measurement, gain regulation being provided in the portion of the signal spectrum where it is really wanted, e.g., at the switching frequency. The radiometer signal spectrum and the gain control switch spectrum are identical, since both high-frequency switches operate at the same switching frequency.

While the invention has been described in its preferred embodiments, it is to be understood that the words which have been used are words of description rather than of limitation and that changes within the purview of the appended claims may be made without departure from the true scope and spirit of the invention in its broader aspects.

What is claimed is:

1. In radio receiver apparatus, the combination comprising:
   first generating means for providing a first cyclic signal,
   second generating means for providing a second cyclic signal,
   driver means for operating said first generator of first cyclic signals in phase quadrature with respect to said second generator of second cyclic signals,
   common circuit means for supplying audiofrequency output signals,
   said common circuit means including signal envelope detection means and amplifier means,
   coupling means responsive to said first and to said second cyclic signal, and coupled to the input of said common circuit means,
   first and second phase-sensitive detectors operated by said driver and coupled to the output of said common circuit means,
   gain control means connected to the output of said second phase-sensitive detector for supplying control signals to a controllable gain stage of said amplifier means for the purpose of ensuring a stable overall gain characteristic for said receiver, and
   utilization means coupled to the output of said first phase-sensitive detector.

2. Apparatus as in claim 1, wherein said first generating means includes:
   antenna means,
   a first reference signal source,
   a first high-frequency switch, and
   means for coupling said antenna means and said first reference signal source to said first high-frequency switch.

3. Apparatus as in claim 1, wherein said second generating means includes:
   a first reference signal source,
   a second reference signal source,
   a second high-frequency switch, and
   means for coupling said first and said second reference signal sources to said second high-frequency switch.

4. Apparatus as in claim 1, wherein said driver means operates said first phase-sensitive detector in phase quadrature with respect to said second phase-sensitive detector.

5. Apparatus as in claim 1, wherein said coupling means comprises hollow transmission line directional coupler means.

6. Apparatus as in claim 1, wherein said driver means supplies a control signal to said first generator and to said first phase-sensitive detector, and supplies said control signal through phase shifter means to said second generator and to said second phase-sensitive detector.

7. Apparatus as in claim 1, wherein said common circuit means includes a signal mixer fed by a local oscillator for producing an intermediate frequency signal.

8. Apparatus as in claim 1, wherein said common circuit means coupled in series includes:
   a signal mixer,
   an intermediate frequency amplifier,
   an envelope detector for producing an audiofrequency output, and
   a narrow-band audio amplifier.

9. Apparatus as in claim 1, wherein said utilization means includes means for displaying radiometric information.

10. Apparatus as in claim 1, wherein said utilization means comprises:
    a low-pass filter, a direct current amplifier responsive to the output of said low-pass filter, and an electric meter responsive to the output of said direct current amplifier.

11. Apparatus as in claim 1, wherein said controllable gain stage comprises a part of said narrow-band audio amplifier.

12. Apparatus as in claim 1, wherein said controllable gain stage comprises a part of said intermediate frequency amplifier.

* * * * *